(12) United States Patent
Fore

(10) Patent No.: US 6,240,248 B1
(45) Date of Patent: May 29, 2001

(54) GAME ATTRACTANT HEATING DEVICE

(76) Inventor: John Fore, 34624 Highway 16, Denham Springs, LA (US) 70726

( * ) Notice: Subject to any disclaimer, the term of this patent is extended or adjusted under 35 U.S.C. 154(b) by 0 days.

(21) Appl. No.: 09/516,403

(22) Filed: Mar. 1, 2000

Related U.S. Application Data

(60) Provisional application No. 60/123,463, filed on Mar. 9, 1999.

(51) Int. Cl.[7] .............................. A01G 13/06; A01M 19/00

(52) U.S. Cl. ............................................... 392/386; 43/129

(58) Field of Search ..................................... 392/386, 390, 392/391, 402, 403, 404, 405, 406; 43/129, 1; 239/135, 136; 219/476, 481, 482, 483, 490, 504, 505

(56) References Cited

U.S. PATENT DOCUMENTS

| | | | | |
|---|---|---|---|---|
| 3,400,252 | * | 9/1968 | Hayakawa et al. | 219/504 |
| 4,450,496 | * | 5/1984 | Doljack et al. | 219/505 |
| 4,771,563 | * | 9/1988 | Easley | 43/1 |
| 5,429,271 | * | 7/1995 | Porter | 43/1 |
| 5,644,866 | * | 7/1997 | Katsuda et al. | 43/219 |
| 5,861,610 | * | 1/1999 | Weiss | 219/497 |

* cited by examiner

Primary Examiner—Sang Paik
(74) Attorney, Agent, or Firm—Joseph N. Breaux

(57) ABSTRACT

A game attractant heating device for heating a quantity of liquid game attractant to a temperature between 90° and 130° degrees Fahrenheit. The heating device preferably includes multiple liquid attractant holding chambers each with a separate heating element for simultaneously heating two liquid attractants simultaneously. The heating device is also preferably battery powered.

1 Claim, 4 Drawing Sheets

GAME ATTRACTANT HEATING DEVICE

This application claims the benefit of Provisional No. 60/123,463 filed Mar. 9, 1999.

DESCRIPTION

1. Technical Field

The present invention relates to hunting accessories and more particularly to a game attractant heating device for heating a quantity of a liquid game attractant, such as deer urine, to facilitate dispersion of the attractant into the air; the game attractant heating device including an attractant heating assembly enclosable within a tubular housing supportable by a hanging strap and accessible through a removable cap having a dispersion opening formed therethrough; the attractant heating assembly including a support board, a liquid game attractant warming tube supported on the support board, a heating resistor positioned within the scent holding cavity of the liquid game attractant warming tube; and a heat adjustment resistor wired in electrical connection with the heating resistor and a battery connector; the heat adjustment resistor being selected to achieve a current flow through the heating resistor to warm a quantity of liquid game attractant positioned within the scent holding cavity of the liquid game attractant warming tube to a temperature between 90° F. and 130° F.

2. Background of Invention

Hunting can be facilitated by the use of liquid attractants that are typically poured onto the ground, pieces of cloth and other structures in order to disperse the attractant scent throughout the hunting area. Some attractant scents, such as game related smells like deer urine, are more readily dispensed when heated to a temperature in the area of the body temperature of a warm blooded animal, typically between 90° to 130° degrees Fahrenheit. This is especially true when the liquid attractants are used in cold weather. It would be a benefit, therefore, to have a game attractant heating device that could heat a quantity of such liquid attractants to a temperature within this range. In addition, it would also be a benefit to have such a heating device that was battery powered and inexpensive to manufacture. Because some hunters believe the use of more than one attractant can be beneficial, it would be a further benefit to have a heating device that included two separate holding chambers each with a separate heating member for heating two separate attractants at the same time.

SUMMARY OF INVENTION

It is thus an object of the invention to provide a game attractant heating device for heating a quantity of liquid game attractant to a temperature between 90° and 130° degrees Fahrenheit.

It is a further object of the invention to provide a game attractant heating device that includes multiple liquid attractant holding chambers each with a separate heating element for simultaneously heating two liquid attractants simultaneously.

It is a still further object of the invention to provide a game attractant heating device that is battery powered.

It is a still further object of the invention to provide a game attractant heating device that includes an attractant heating assembly enclosable within a tubular housing supportable by a hanging strap and accessible through a removable cap having a dispersion opening formed therethrough; the attractant heating assembly including a support board, a liquid game attractant warming tube supported on the support board, a heating resistor positioned within the scent holding cavity of the liquid game attractant warming tube; and a heat adjustment resistor wired in electrical connection with the heating resistor and a battery connector; the heat adjustment resistor being selected to achieve a current flow through the heating resistor to warm a quantity of liquid game attractant positioned within the scent holding cavity of the liquid game attractant warming tube to a temperature between 100° F. and 130° F.

It is a still further object of the invention to provide a game attractant heating device that accomplishes all or some of the above objects in combination.

Accordingly, a game attractant heating device is provided. The game attractant heating device including an attractant heating assembly enclosable within a tubular housing supportable by a hanging strap and accessible through a removable cap having a dispersion opening formed therethrough; the attractant heating assembly including a support board, a liquid game attractant warming tube supported on the support board, a heating resistor positioned within the scent holding cavity of the liquid game attractant warming tube; and a heat adjustment resistor wired in electrical connection with the heating resistor and a battery connector; the resistance value of the heat adjustment resistor being selected to achieve a current flow through the heating resistor to warm a quantity of liquid game attractant positioned within the scent holding cavity of the liquid game attractant warming tube to a temperature between 100° F. and 130° F.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY EMBODIMENTS

Figure 1:
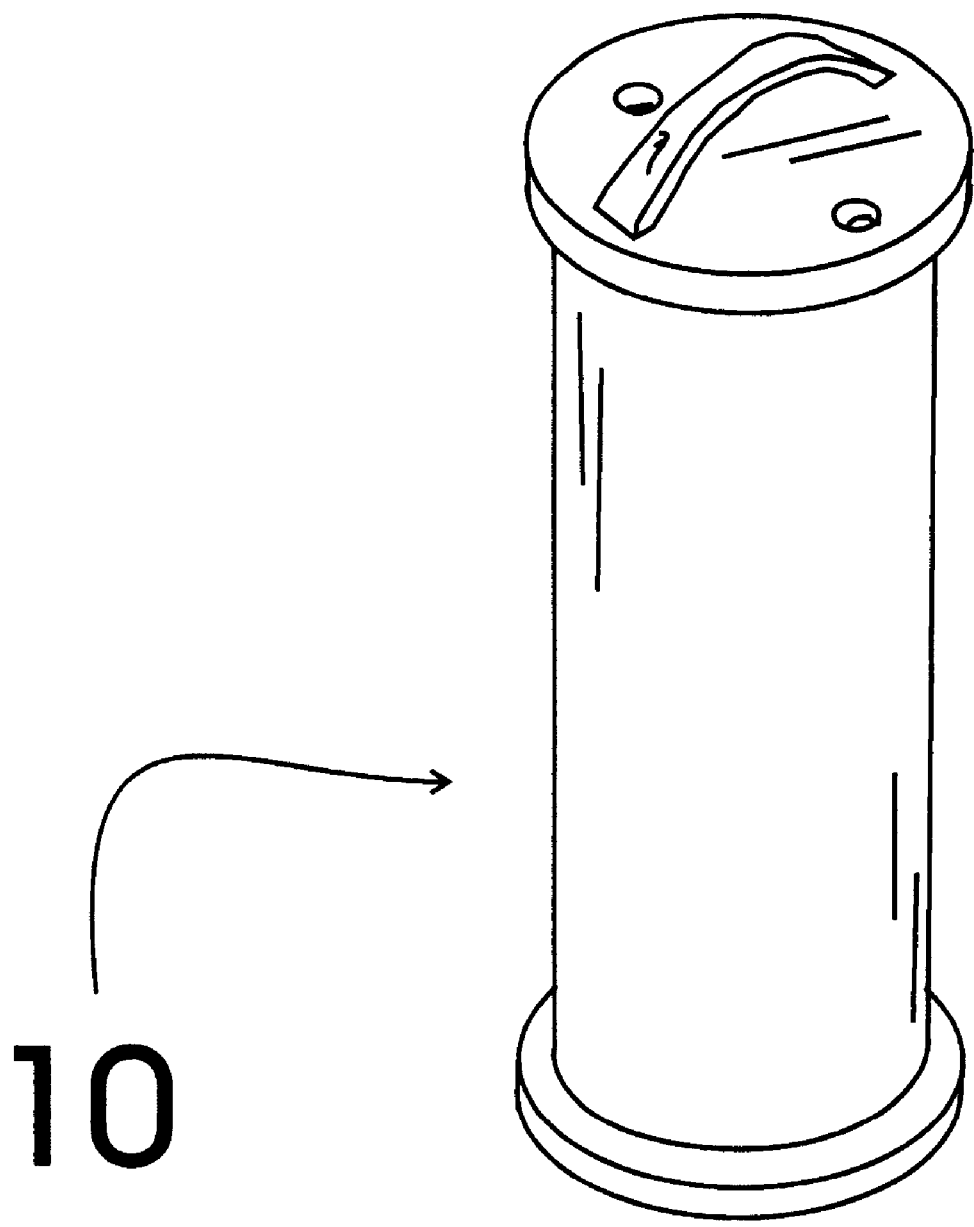
FIG. 1 is a perspective view of an exemplary embodiment of the game attractant heating device of the present invention showing the tubular housing; the detachable bottom cap; and the detachable top cap with the scent dispersion openings and the hanging strap.

FIG. 1 shows an exemplary embodiment of the game attractant heating device of the present invention, generally designated 10, as it appears when in use. Referring to FIG.

2, heating device 10 includes a tubular plastic housing 12; a detachable plastic bottom cap 14; a detachable plastic top cap 16 with two scent dispersion openings 18*a*, 18*b* and a hanging strap 20; and an attractant heating assembly, generally designated 24, housed within tubular housing 12.

Figure 2:
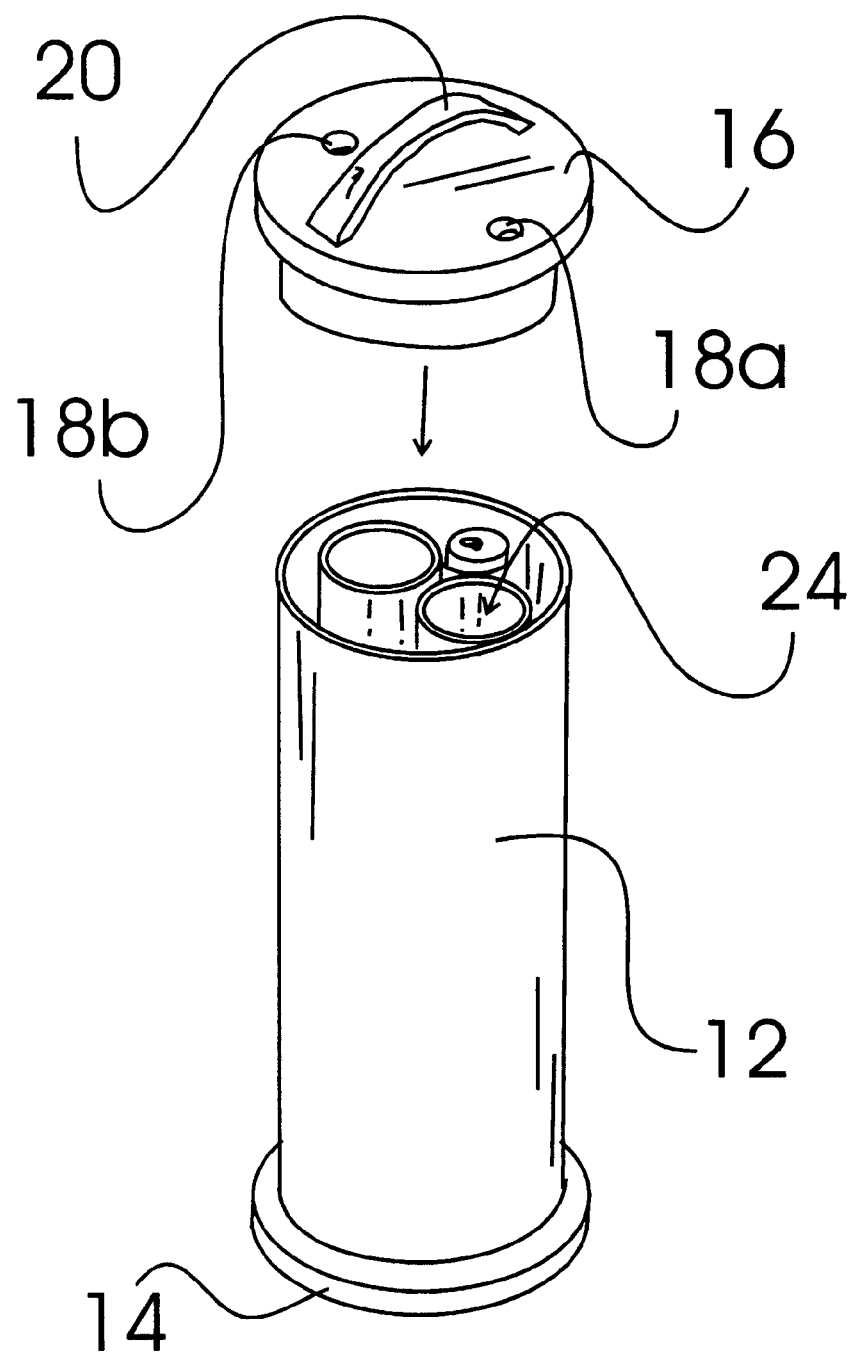
FIG. 2 is an exploded perspective view of the exemplary game attractant heating device of the present invention with the detachable top cap lifted off the tubular housing showing the two liquid game attractant warming tubes and the power "on" indicator LED protection tube of the attractant heating assembly.
Figure 3:
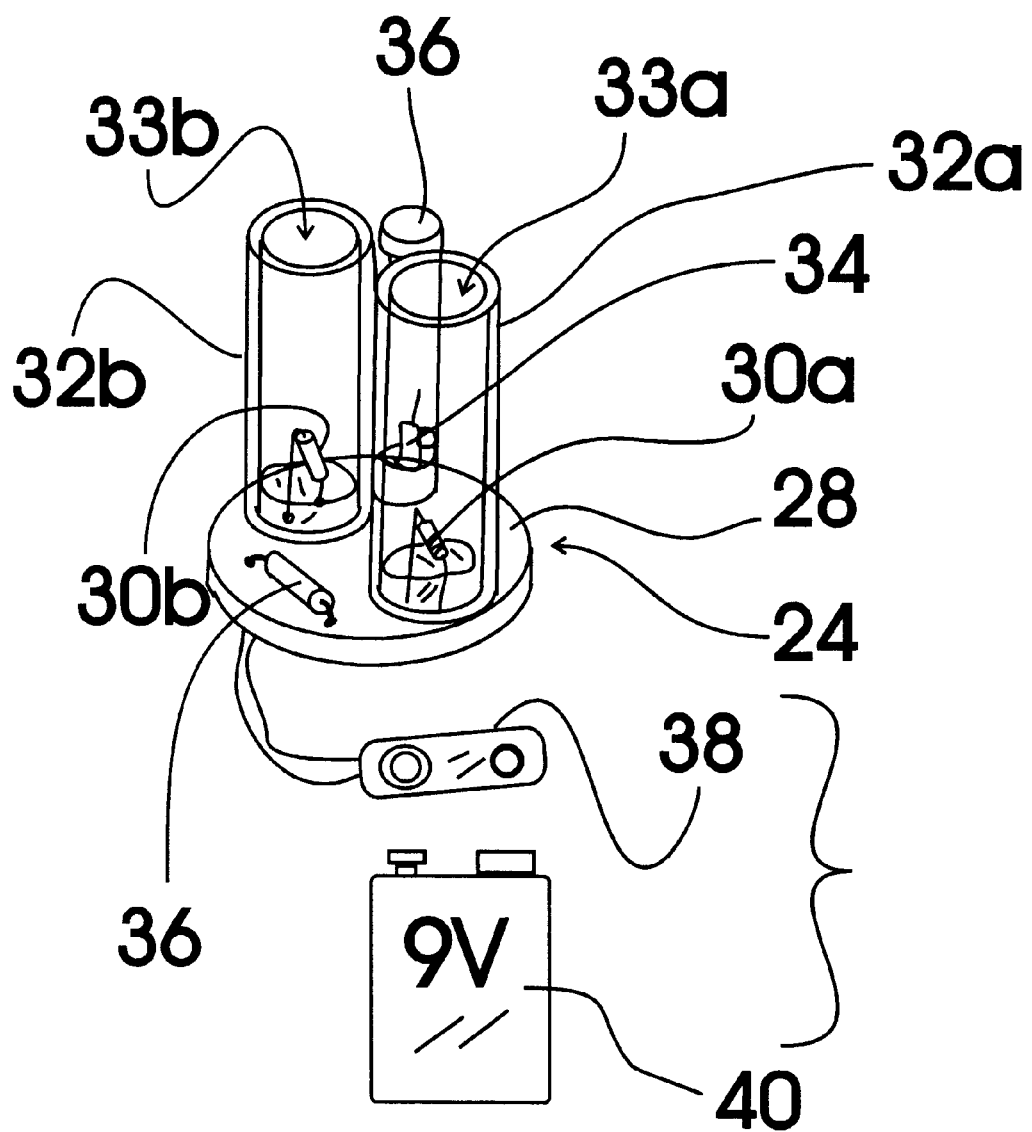
FIG. 3 is a perspective view of the attractant heating assembly of the device of FIG. 2 removed from the tubular housing showing the two heating resistors each sealed within the bottom of a liquid game attractant warming tubes, the power "on" indicator LED positioned within the power "on" indicator LED protection tube; the heat adjustment resistor; the circular support board; the nine Volt battery connector; and a representative nine Volt battery.
Figure 4:
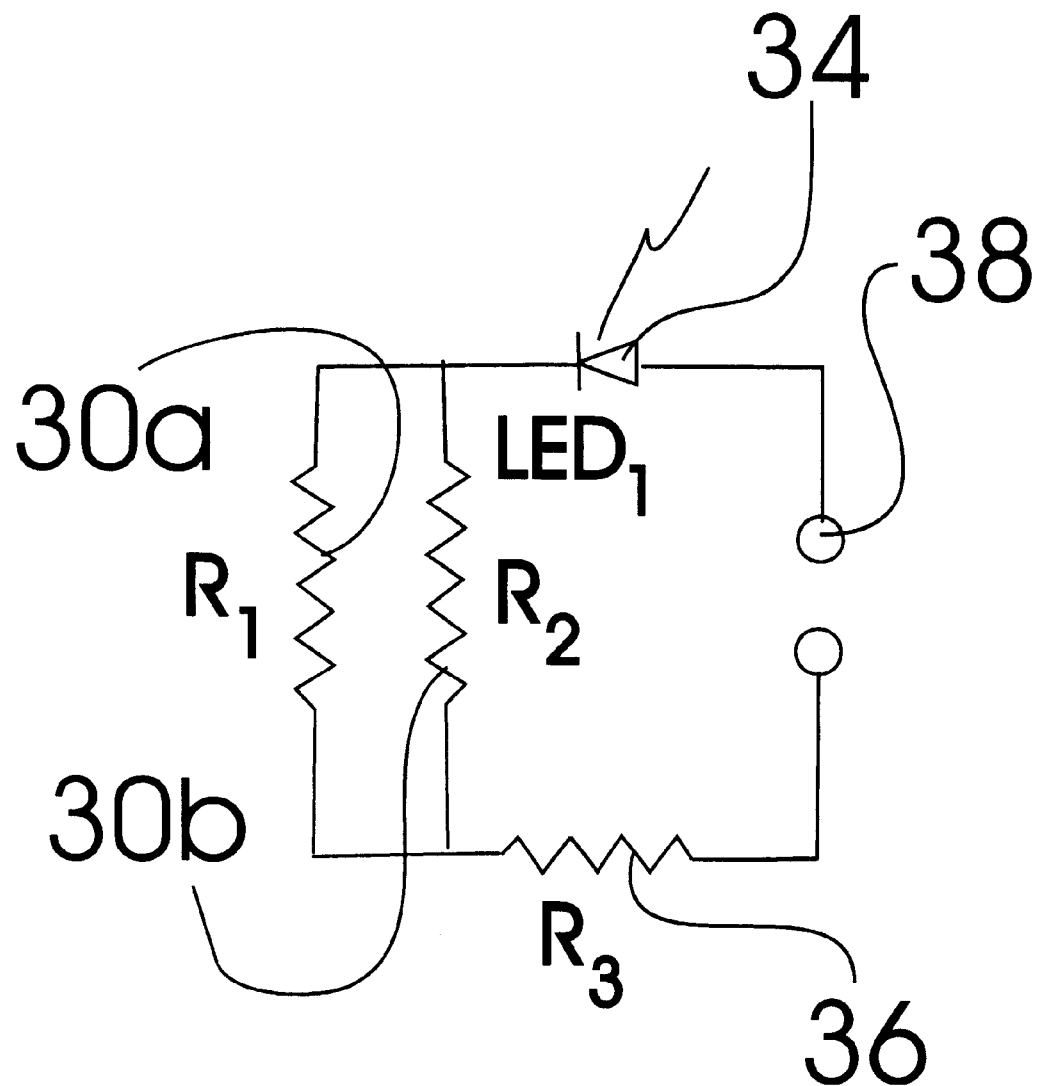
FIG. 4 is a schematic diagram of the attractant heating assembly of the device of FIG. 2 showing the two heating resistors wired in parallel with each other and in series with the heat adjustment resistor and the power "on" indicator LED.

Referring to FIG. 3, attractant heating assembly 24 includes a circular support board 28 sized to slide into tubular housing 12 (FIG. 2); two convention carbon, 220 Ohm, heating resistors 30*a*, 30*b* each sealed within the bottom of a plastic liquid game attractant warming tube 32*a*,32*b* with a quantity of epoxy such that the resistance portion is above the epoxy and positioned within a liquid attractant holding chamber 33*a*, 33*b* of each warming tube 32*a*, 32*b*; a power "on" indicator LED 34 positioned within a power "on" indicator LED protection tube 36 that is secured to support board 28; a conventional carbon, 1,200 Ohm, heat adjustment resistor 36; a nine Volt battery connector 38; and a nine Volt battery 40. Nine Volt battery 40 is connected to and disconnected from to activate and deactivate, respectively, the attractant heating assembly 24. It has been found by the inventor hereof that one nine Volt battery is sufficient to operate attractant heating assembly 24 for seven to ten hours. In this embodiment the two heating resistors 30*a*, 30*b* are wired in parallel with each other and in series with the heat adjustment resistor 36, the power "on" indicator LED 34, and batter connector 38.

It can be seen from the preceding description that a game attractant heating device has been provided that includes a heating mechanism for heating a quantity of liquid game attractant to a temperature between 90° and 130° degrees Fahrenheit; that includes multiple liquid attractant holding chambers each with a separate heating element for simultaneously heating two liquid attractants simultaneously; that is battery powered; and that includes an attractant heating assembly enclosable within a tubular housing supportable by a hanging strap and accessible through a removable cap having a dispersion opening formed therethrough; the attractant heating assembly including a support board, a liquid game attractant warming tube supported on the support board, a heating resistor positioned within the scent holding cavity of the liquid game attractant warming tube; and a heat adjustment resistor wired in electrical connection with the heating resistor and a battery connector; the heat adjustment resistor being selected to achieve a current flow through the heating resistor to warm a quantity of liquid game attractant positioned within the scent holding cavity of the liquid game attractant warming tube to a temperature between 100° F. and 130° F.

It is noted that the embodiment of the game attractant heating device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A game attractant heating device comprising:

a tubular housing having a hanging cap and a removable cap having a dispersion opening formed therethrough; and an attractant heating assembly enclosed within said tubular housing by said removable cap;

said attractant heating assembly including a support board, a liquid game attractant warming tube supported on said support board, a heating resistor positioned within a scent holding cavity of said liquid game attractant warming tube, and a heat adjustment resistor wired in electrical connection with said heating resistor and a battery connector;

a resistance value of said heat adjustment resistor being selected to achieve a current flow through said heating resistor to warm a quantity of liquid game attractant positioned within said scent holding cavity of said liquid game attractant warming tube to a temperature between 100° F. and 130° F.

\* \* \* \* \*